United States Patent [19]

Browne

[11] Patent Number: 4,938,248

[45] Date of Patent: Jul. 3, 1990

[54] MOISTURE AND PRESSURE SENSITIVE FLUID CONTROL CIRCUIT

[75] Inventor: Christopher L. Browne, Philomath, Oreg.

[73] Assignee: Irro-Controls Group, Corvallis, Oreg.

[21] Appl. No.: 189,575

[22] Filed: May 3, 1988

Related U.S. Application Data

[63] Continuation-in-part of Ser. No. 46,803, May 4, 1987, abandoned.

[51] Int. Cl.⁵ ............................................. A01G 25/00
[52] U.S. Cl. ..................................... 137/78.3; 239/63; 251/29
[58] Field of Search ................. 137/78.3, 489; 251/29, 251/45; 47/48.5; 239/63

[56] References Cited

U.S. PATENT DOCUMENTS

| | | | |
|---|---|---|---|
| Re. 29,022 | 11/1976 | Spencer | 239/542 |
| 1,029,688 | 6/1912 | Johnson | 251/29 |
| 2,557,536 | 6/1951 | Drane et al. | 137/53 |
| 2,743,552 | 5/1956 | Hunter | 47/1 |
| 2,811,167 | 10/1957 | Bott | 137/414 |
| 2,863,698 | 12/1958 | Richards | 239/64 |
| 2,878,671 | 3/1959 | Prosser et al. | 73/73 |
| 2,893,641 | 7/1959 | Hunter | 239/64 |
| 3,165,115 | 1/1965 | Erson | 137/494 |
| 3,300,174 | 1/1967 | Urban et al. | 251/29 |
| 3,570,542 | 3/1971 | Otto | 251/29 |
| 3,621,872 | 11/1971 | Fisher | 137/494 |
| 3,642,204 | 2/1972 | McCloskey | 239/63 |
| 3,747,399 | 7/1973 | Treirat | 73/73 |
| 3,814,377 | 6/1974 | Todd | 239/542 |
| 3,874,590 | 4/1975 | Gibson | 239/63 |
| 3,898,872 | 8/1975 | Skaling et al. | 73/73 |
| 3,910,300 | 10/1975 | Tal | 137/78 |
| 4,055,200 | 10/1977 | Lohoff | 137/624.11 |
| 4,113,180 | 9/1978 | Christy et al. | 239/542 |
| 4,182,357 | 1/1980 | Ornstein | 137/1 |

Primary Examiner—A. Michael Chambers
Attorney, Agent, or Firm—Klarquist, Sparkman, Campbell, Leigh & Whinston

[57] ABSTRACT

A control circuit includes one or more pressure activated fluid flow valves and one or more moisture and pressure sensitive controllers. Each controller includes a body with three chambers separated by movable diaphragm assemblies, one of which moves in response to changes in pressure exerted by the amount of moisture or fluid in the environment. Responsively, a passageway through the other diaphragm allows the passage of fluid and thus venting of the flow valves when a low moisture or fluid condition is detected.

29 Claims, 8 Drawing Sheets

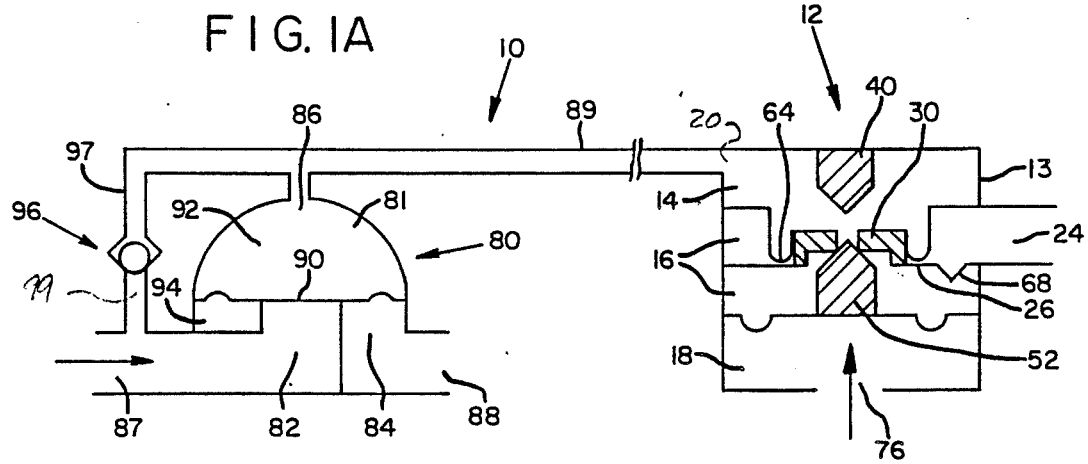
FIG. IA
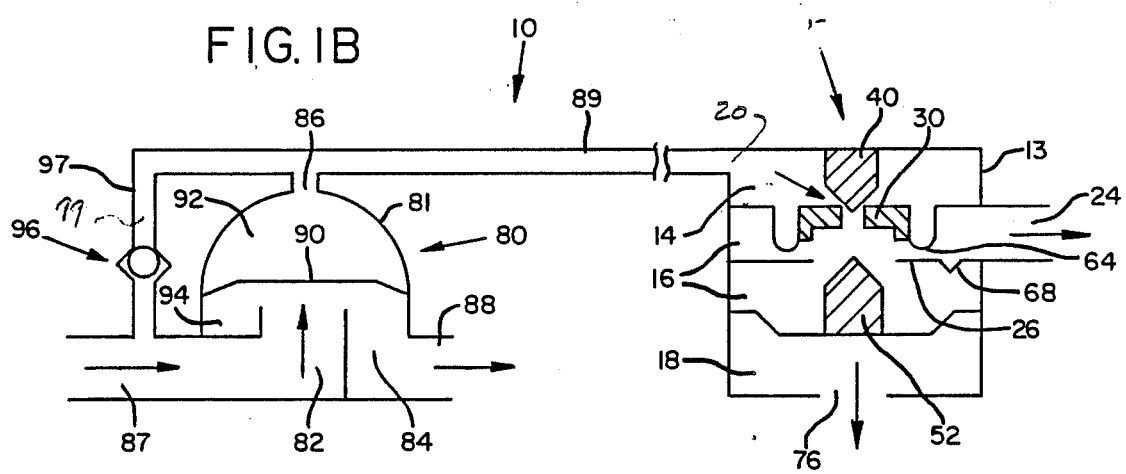
FIG. IB

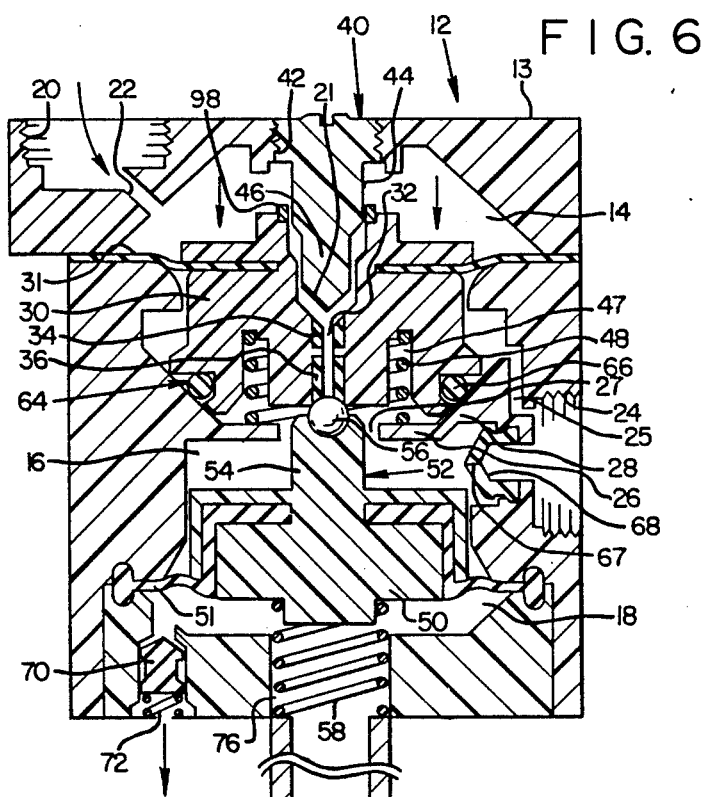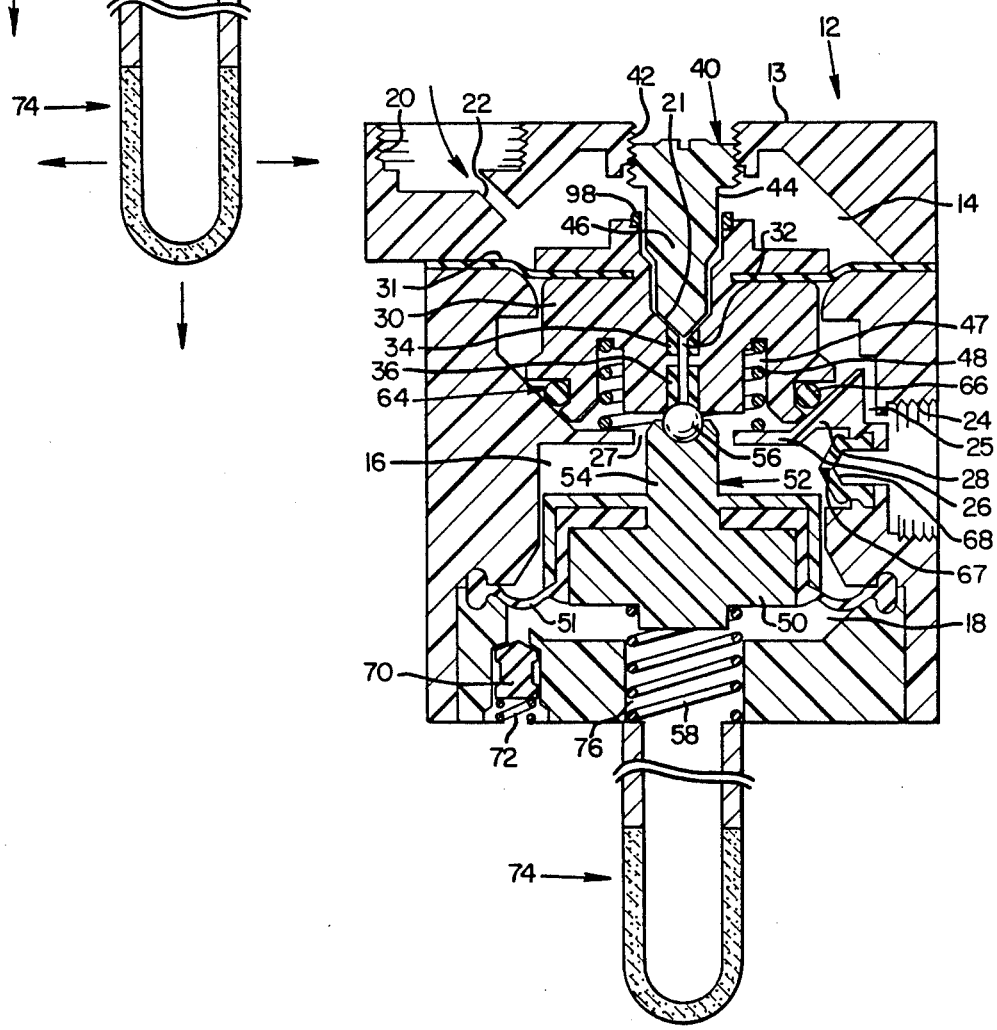

MOISTURE AND PRESSURE SENSITIVE FLUID CONTROL CIRCUIT

This is a continuation-in-part of application Ser. No. 046,803, filed May 4, 1987, now abandoned, the disclosure of which is incorporated by reference.

BACKGROUND OF THE INVENTION

This invention concerns hydraulic or pneumatic control circuits and valve arrangements that automatically and remotely open and close hydraulically or pneumatically operated fluid control valves located within an irrigation or other fluid distribution system.

An example of such a circuit is an irrigation system which employs control valves that are opened by the venting of pressurized fluid contents that normally cause their closure. Closing the venting pathway permits the reestablishment of pressure, and subsequent closing of the control valves. The source of fluid pressure for this closure may be the irrigation fluid supply itself, or some external source.

Such fluid circuits have previously been used in irrigation systems to control flow of water to soil being monitored for moisture content. U.S. Pat. Nos. 2,743,552; 3,747,399; and 4,055,200, for example, disclose automatic irrigation devices in which a fluid circuit valve is responsive to a ceramic cell which absorbs water from monitored soil surrounding the cell.

Such devices, however, do not always reliably respond to changing moisture conditions in the soil. They therefore do not accurately determine when to initiate irrigation, or how much irrigation water to provide once irrigation is initiated.

It is accordingly a primary object of the invention to provide a fluid control circuit which reliably and consistently detects the amount of fluid in an environment and provides a signal that initiates fluid flow.

It is a further primary object of the invention to provide an irrigation control circuit which accurately monitors the amount of moisture in an environment, and terminates irrigation at a preselected point once sufficient moisture has been provided to the environment.

Another object is to provide such a circuit which responds automatically to changing environmental moisture conditions without the necessity of manual operations.

Yet another object is to provide such a circuit which can be conveniently and selectively activated by an operator.

Another object is to provide such a circuit which can operate solely in response to changing pressure conditions within the circuit.

Another object is to provide a novel fluid control device that effects the automatic activation and deactivation of hydraulically or pneumatically operated fluid control valves in response to differentials in fluid pressure.

In particular, it is an object to provide a control device that is highly sensitive to small and often minute differentials in fluid pressure.

Another object is to provide a control device that opens and closes rapidly and completely upon attainment of desired activating and de-activating differentials in fluid pressure.

A further object is to provide a control device having adjustable, definable and highly repeatable activation and deactivation points.

Also an object is to provide a control device having activation and deactivation points that are largely insensitive to changes in fluid supply pressure.

Yet another object is to provide a fluid control circuit that maintains continuous prime.

Another specific object is to provide an irrigation or fluid control device that can remotely and automatically activate and deactivate a hydraulically or pneumatically operated irrigation or fluid control valve in response to differentials in fluid pressure that result from the drying and wetting of irrigated media, the evaporation and precipitation of fluids, or the draining and replenishment of fluid-containing vessels.

A final specific object is to provide such a device that is responsive to pressure changes or differentials that occur in a piped irrigation or fluid application system during the course of a normal cycle of operation.

SUMMARY OF THE INVENTION

The foregoing and other objects are achieved by a new control circuit that is highly sensitive to changes in pressure, and particularly by use of a controller of novel design within the circuit. The body of the controller defines first, second, and third chambers. A control valve port communicates with the first chamber, and a controller outlet communicates with the second chamber through a controller outlet passageway.

A first movable diaphragm assembly separates the first and second chambers and defines a diaphragm passageway. One end of the diaphragm passageway provides a first valve seat for the first chamber while the opposite end of the passageway provides a second valve seat for the second chamber.

A first valve closing member is provided within the first chamber above the first diaphragm assembly. A first biasing means urges the first diaphragm assembly against the first valve closing member such that the closing member seats on the first valve seat of the diaphragm passageway.

A second movable diaphragm assembly separates the second and third chambers and includes a second valve closing member which seats, in the closed position, against the second valve seat of the diaphragm passageway.

Valve means are also provided in the controller outlet passageway for selectively preventing fluid communication between the second chamber and controller outlet passageway when the valve means is closed. The valve means is opened by movement of the first diaphragm assembly in the direction urged by the first diaphragm biasing means.

A fluid detection means communicates with the third chamber and applies a closing force to seat the second valve closing member of the second diaphragm assembly against the second valve seat when sufficient fluid is present in a region sensed by the detection means.

The controller communicates with a pressure-responsive flow control valve. One such valve has a body defining an inlet, a primary outlet and a venting outlet. Fluid from a fluid source moves into the flow control valve through the inlet, while the primary outlet conveys irrigation fluid from the flow control valve to soil which is being irrigated. A pressure responsive diaphragm in the flow control valve opens a passageway to the primary outlet to allow flow of fluid to irrigate soil when pressure at the venting outlet is less than pressure at the inlet. The pressure responsive diaphragm conversely closes the passageway automatically to terminate irrigation flow when pressure at the venting outlet is equal to or greater than pressure at the inlet. The pressure at the venting outlet, which determines whether the primary outlet is open or closed, is varied by the controller described above. The controller therefore initiates and terminates irrigation flow.

Features and further embodiments of the invention include:

1. A mechanism for prevention of backflow and backsiphonage in the fluid control circuit.

2. Manual override and manual activation mechanisms.

3. Fluid-filtering capabilities.

4. A hydraulic tensiometer which senses changes in the moisture tension of irrigated media and communicates these changes to the third chamber. The tensiometer includes a sealed water-filled chamber bounded at one end by a porous membrane of ceramic or other material, and at another end by a diaphragm that operates the second movable diaphragm assembly and second closing member of the controller previously described. As moisture tension in the irrigated medium declines to a selected level, the membrane of the tensiometer permits egress of water to create an internal negative pressure to move the diaphragm which causes the controller to open the flow control valve and permit irrigation to commence. When the membrane becomes thoroughly wetted, pressure increases within the sealed, water-filled chamber which in turn causes the controller to close the flow control valve and terminate irrigation.

5. A control circuit arrangement that utilizes a pressurization of the controller's secondary chamber, upon opening of the controller, to pressurize the fluid contents of the tensiometer chamber by moving the second diaphragm assembly. Such pressurization accelerates opening of the controller, and vents liquid and accumulated gases from the top of the tensiometer chamber through a pressure relief valve.

6. A mechanism for adjusting the downward travel of the valve seat so that, subsequent to opening, the distance of travel required to close the closing member may be increased. Increasing the travel distance increases the differential between activating and deactivating points and increases the volume of liquid recapture required of a tensiometer to close the controller. In embodiments that employ a ceramic moisture-sensing element, a further effect is an increase in the duration between initial wetting of the porous ceramic element and the termination of irrigation.

Particular advantages of control circuits of the present invention are that the controller uses no electricity and is adjustable. In certain embodiments, air is automatically vented from the controller to minimize maintenance. Multiple controllers that sense soil moisture at different depths, and which activate in unison, are also particularly advantageous for control of wetted-zone dimensions of irrigation systems exhibiting slow application rates, or for control of irrigation of deep-rooted plants.

Other objects, advantages and features of the invention will become evident from the drawings and following detailed description.

BRIEF DESCRIPTION OF THE DRAWINGS

In the drawings:

FIG. 1A is a schematic diagram of a fluid circuit of the present invention which controls irrigation flow, wherein a flow control valve and controller in the circuit are both closed;

FIG. 1B is a schematic diagram of the fluid control circuit shown in FIG. 1A, but with the flow control valve and controller both shown in the open position;

FIGS. 2–6 show sequential steps in initiating and terminating irrigation with the fluid circuit of the present invention, wherein:

FIG. 2 is a somewhat schematic enlarged, vertical sectional view of the controller of FIGS. 1A and 1B with both the first and second diaphragm assemblies in a normally closed position;

FIG. 3 is a vertical sectional view similar to FIG. 2, but showing the first diaphragm assembly in a closed position and the second diaphragm assembly in an open position;

FIG. 4 is a view of the controller shown in FIG. 3, but with the first movable diaphragm assembly moved to an open position;

FIG. 5 is a view of the controller shown in FIG. 4, but with the second diaphragm assembly moved to a closed position;

FIG. 6 is a view of the controller shown in FIG. 5, but with both the first and second diaphragm assemblies in a closed position;

FIG. 7 is a somewhat schematic, vertical sectional view of the controller which illustrates how the fluid circuit is manually overridden to prevent irrigation;

DETAILED DESCRIPTION OF PREFERRED EMBODIMENTS

Figure 2:
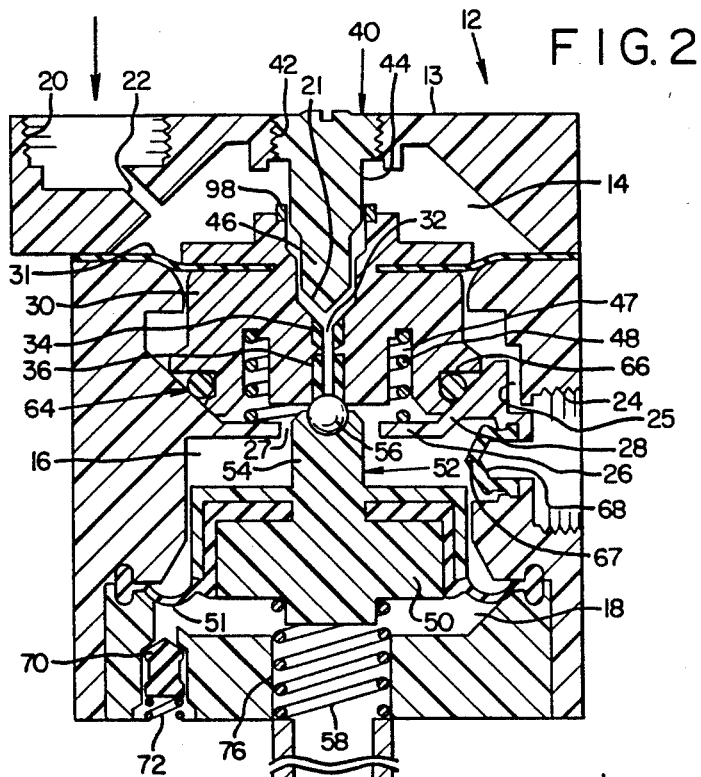

According to the disclosed embodiment of the present invention, an irrigation control circuit (FIG. 1) is provided which regulates the flow of water to a downstream application system, such as an irrigation sprinkler line. A control valve is opened by venting a chamber which contains pressurized fluid that holds the valve closed. The controller vents the chamber in response to changes in soil moisture pressure, changes in liquid head, or in other instances, changes in pressure in the control circuit itself.

Control circuits and controllers according to the present invention can take many forms. The following detailed description will illustrate several such forms.

Embodiment of FIGS. 1-8

FIGS. 1-8 disclose a first embodiment of the invention in which a fluid control circuit 10 (FIGS. 1A and 1B) includes a controller valve 12 (FIGS. 1-8) having a body 13 that defines a first chamber 14, second chamber 16, and third chamber 18. A control valve port 20 (FIGS. 2-8) is provided through the top of body 13 and communicates with first chamber 14 through a fluid passageway 22. Port 20 is internally threaded for receiving a fluid connection with the control valve of circuit 10. A control outlet port 24 is provided through the wall of body 13 and fluidly communicates with second chamber 16 through a fluid passageway 25. Control outlet port 24 is internally threaded and establishes a fluid connection with the atmosphere.

Second chamber 16 is partially partitioned by an annular ring 26 that defines a central opening 27. The annular wall of chamber 16 slants outwardly at 28 from ring 26 to the point at which passageway 25 enters chamber 16 above ring 26.

A first movable diaphragm assembly 30 separates first and second chambers 14, 16 and carries a diaphragm 31 which is peripherally anchored in body 13. A diaphragm passageway 32 passes axially through diaphragm assembly 30 and includes an enlarged diameter top portion and a reduced diameter lower portion. The reduced diameter portion is provided at its top end with an elastomeric seal that forms first valve seat 34, while the opposite rigid end of passageway 32 is similarly provided with an interior, annular elastomeric seal that defines a second valve seat 36.

A first valve closing member 40 is provided within first chamber 14. The closing member 40 includes a large diameter, externally threaded head 42, the threads of which mate with the internal threads of a hole through the top face of body 13. Closing member 40 also includes an intermediate diameter middle shank portion 44 and a reduced diameter lower shank portion 46 which defines a bottom inclined face that narrows to a point at the distal end of closing member 40. The inclined face of lower shank portion 46 is shaped to fluidly seal against the complementary shape of first valve seat 34 of diaphragm passageway 32, with the point partially inserted into passageway 32, when diaphragm assembly 30 moves upwardly against closing member 40.

An annular recess is provided in the bottom of assembly 30 to house a spring 48 which seats on ring 26 and biases first assembly 30 upwardly toward closing member 40 such that member 40 normally seats on first seat 34.

A second movable diaphragm assembly 50 separates the second and third chambers 16, 18 and carries an annular diaphragm 51 which is peripherally anchored in body 13. A second valve closing member 52 projects upwardly from assembly 50. The valve closing member 52 includes a cylindrical projection 54 which defines, at its distal end, a seat which holds a bearing 56. Second valve closure member 52 seats, in its closed position, against second elastomeric valve seat 36 and the rigid material which surrounds the seat 36. A spring 58 is positioned between second diaphragm assembly 50 and the bottom of body 13 to bias assembly 50 into a normally closed position with second valve closure member 52 fluidly sealing diaphragm passageway 32 by seating against second valve seat 36.

A valve means 64 is positioned in the controller outlet passageway 24 to selectively prevent flow of fluid from second chamber 16 through passageway 25 and controller outlet port 24. The valve means 64 is an annular seal 66 provided around the bottom of diaphragm assembly 30 and which seats against inclined portion 28 of the wall of body 13. When valve means 64 is in the position shown in FIG. 1, fluid does not flow from chamber 16 to outlet port 24. When valve means 64 moves to the open position shown in FIG. 4, however, fluid flow from chamber 16 to outlet port 24 is permitted through passageway 25. Valve means 64 is opened by movement of first diaphragm assembly 30 in the direction urged by spring 48.

A slit-type orifice 67 of a one-way check valve means 68 also connects outlet port 24 with second chamber 16 independently of passageway 25 and permits fluid to flow into chamber 16 from outlet port 24 through the orifice 67 when pressure applied to outlet port 24 exceeds that of chamber 16. Valve 68 does not allow fluid to flow, however, from second chamber 16 to outlet port 24.

Another one-way valve 70 is located in an opening through the bottom of body 13. Valve 70 is biased by spring 72 into a normally closed position shown in FIG. 2. Valve 70 overcomes the bias of spring 72 and opens to permit egress of fluids from third chamber 18 only when pressure exerted by fluid in chamber 18 against valve 70 overcomes the closure force exerted by spring 72.

A fluid detection means 74, which is a probe-type tensiometer fitted with a ceramic tip, communicates with third chamber 18 through an opening 76 in the bottom face of body 13. The spring 58 is capable of applying a closing force to seat ball 56 of second valve closing member 52 against second valve seat 36 of passageway 32 when sufficient fluid is absorbed through the ceramic tip into the interior of the tensiometer.

Controller 12 is disposed downstream in fluid circuit 10 from a flow control valve 80 (FIGS. 1A and 1B). The valve 80 has a body 81 which defines an inlet 82, a primary outlet 84, and a venting outlet 86. Inlet 82 communicates with fluid line 87, which provides a supply of pressurized irrigation fluid; primary outlet 84 leads to an irigation distribution flow line 88, and venting outlet 86 communicates with control valve port 20 through a control line 89.

A pressure responsive diaphragm 90 divides body 81 into a top chamber 92 which communicates only with venting outlet 86, and a bottom chamber 94 which communicates with both inlet 82 and outlet 84. Diaphragm 90 moves between a closing position (FIG. 1A) in which the diaphragm prevents fluid flow from inlet 82 into bottom chamber 94 and outlet 84, and an open position (FIG. 1B). When diaphragm 90 is in the open position shown in FIG. 1B, fluid can flow through inlet 82, into bottom chamber 94, and out of outlet 84.

Diaphragm 90 automatically moves between its closed and open positions in response to changing pressure differentials across the diaphragm. When pressure at venting outlet 86 is less than pressure at inlet 82, diaphragm 90 is in the open position shown in FIG. 1B. When pressure at venting outlet 86 is equal to or greater than pressure at inlet 82, diaphragm 90 moves to the closed position shown in FIG. 1A.

A fluid line 97 provides a fluid transfer passageway 99 connecting supply line 87 and control line 89 upstream of controller 12. A flow-restricting device is located in the passageway 99. In the illustrated embodiment, the flow-restricting device is a valve 96 which takes the form of a pressure-compensating trickle irrigation emitter (e.g., as shown in U.S. Pat. No. 4,113,180 and U.S. Pat. No. Re. 29,022). The emitter of valve 96 is preferably characterized by a constant and slow flow rate over a wide range of upstream fluid pressures; this flow rate usually being in the vicinity of one gallon per hour. This recommended flow-restricting valve is also characterized by a large orifice size in the open condition. This facilitates flushing, at the commencement of a closing cycle, of particulate matter accumulated during the most recently closed condition of the valve. A simpler form of flow-restricting device (not shown) is a passageway 99 having at least one region with a cross-sectional area sufficiently small to restrict flow.

Operation of Embodiment of FIGS. 1–8

The first embodiment of the invention shown in FIGS. 1–6 employs a controller shown in FIG. 2, that is sensitive to differentials in moisture pressure (or tension) of irrigated media such as soils. Such pressure is normally close to that of the atmosphere when the medium is saturated, and becomes increasingly negative with respect to atmospheric pressure as the medium dries. Controller 12 is sensitive to such pressure changes by means of water-filled tensiometer 74 which includes a probe of variable length fitted with a porous ceramic tip. Negative pressure is generated inside tensiometer 74 in proportion to the drying of surrounding media, and by the egress of a small quantity of water. This negative pressure is registered by diaphragm assembly 50 which operates the pilot valve-closing member 54. Assembly 50 is maintained in a normally closed position against the end of passageway 32 and valve seat 36 by the force of spring 58.

First diaphragm assembly 30 is also operated by a diaphragm, and is maintained in a closed position by fluid pressure in chamber 14 acting upon the diaphragm of assemby 30. This fluid pressure in chamber 14 also causes the closure of flow control valve 80

Opening of the Pilot Valve

Figure 3:
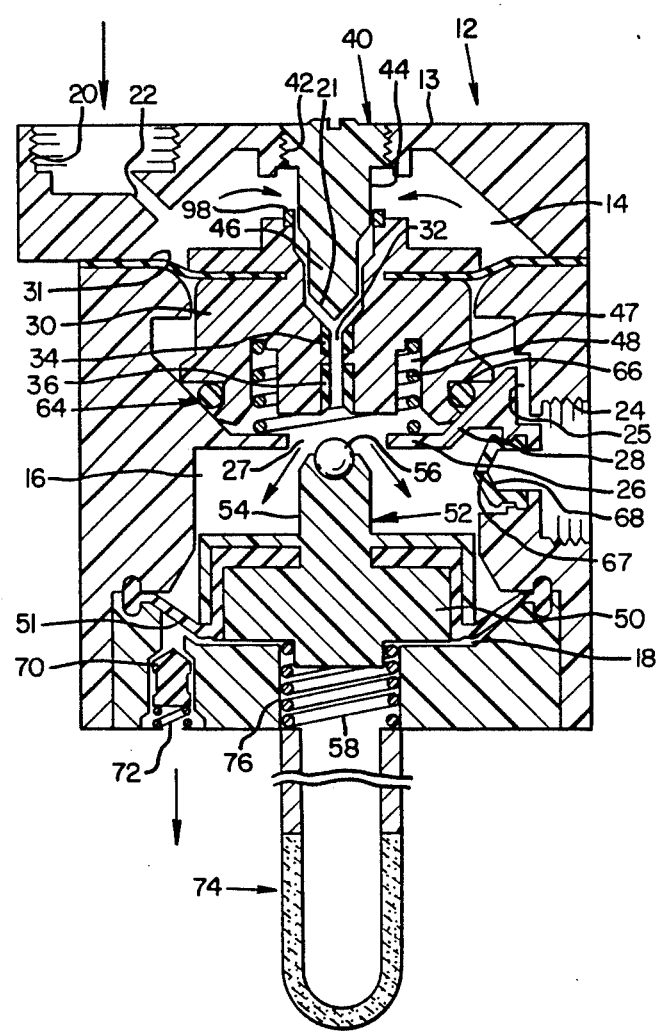

As shown in FIG. 3, the pilot valve is initially opened when the combined effects upon diaphragm assembly 50 of negative pressure in the tensiometer 74, and downstream pressure in chamber 16, exceed the seating force of the compression spring 58. Downstream pressure is transmitted to chamber 16 by one-way pressure check valve 68.

The exertion of fluid pressure in chamber 14 upon the seating area of ball 56 also contributes to opening closing member 52. This effect is minimized to negligible proportions by minimizing the orifice area of second valve seat 36 with respect to the effective pressure responsive surface of diaphragm assembly 50.

The seating force of assembly 50 provided by spring 58 is borne principally by the rigid material which surrounds the elastomeric second valve seat 36. The sealing force for effective closure is provided principally by the action of fluid pressure acting internally upon the elongated elastomeric valve seat 36. Greater pressure induces higher sealing force for compression of the valve seat against ball closure 56. This separation of seating and sealing forces provides a well-defined cracking point, as well as effective sealing over a wide range of fluid pressures and valve seating forces.

Initial opening of assembly 50 results from closure member 52 commencing to travel away from valve seat 36. This movement permits pressurized fluid to escape from chamber 14 to chamber 16 through passageway 32. Once commenced, the rate of escape is accelerated by the effect of trapped pressure acting upon diaphragm assembly 50, and the resulting increase in the size of the valve opening defined by valve seat 36. Passageways for the escape of pressurized fluid from chamber 16 are sealed by the one-way pressure check valve 68, and valve means 64 operated by diaphragm assembly 30.

The seating area of the valve means seal 66 against the chamber body 13 approximates the upstream area of the pressure responsive surface of diaphragm assembly 30. This seating area also substantially exceeds that of the valve seat 36, and as such prevents the build-up of pressure in chamber 16 resulting from any leakage of pressurized fluid from chamber 14 which does not result from the actual cracking of the pilot valve.

The seating force that maintains the back-pressure valve means 64 closed is provided by fluid pressure in chamber 14 acting upon the upstream surface of diaphragm assembly 30. Seal 66 is positioned so that the tendency to seal is increased with increasing pressure in chamber 16. This allows a separation of seating and sealing forces which permits defined spatial positioning of the pilot valve seat under a wide range of fluid pressures in chamber 14, as well as definition of the effectiveness with which the valve means 64 seals passageway 25.

As the second valve closing member 52 travels away from valve seat 36 during opening, pressurized fluid flows from chamber 14 to chamber 16 in response to a pressure differential. With commencement of this flow, a pressure drop occurs in chamber 14. A pressure drop in turn occurs in control valve port 20 which is the hydraulic connection leading to the irrigation flow valve line 89. The pressure drop in chamber 14 partially opens flow control valve 80 by commencing the movement of diaphragm 90 to the position shown in FIG. 1B.

Rapid displacement of closure member 52 and diaphragm assembly 50 away from valve seat 36 as a result of increasing pressure in chamber 16 is accommodated by one-way pressure relief valve 70 which services the third chamber 18. This pressure relief valve is positioned to vent from the top of the tensiometer 74, in sequence, any accumulated gases, then tensiometer fluid. The maximum volume of fluid displaced through the relief valve 70 is determined by limiting the travel of second movable diaphragm assembly 50 within the housing 13. Other factors influencing the volume of displacement include the cracking-pressure of the relief valve 70 as determined by its seating area and the compression of spring 72; the extent of the maximum pressure differential existing between chambers 16 and 18 during opening; and the duration of maintenance of this differential.

Tensiometers can be very sensitive instruments when the accumulation of dissolved gases is prevented. Sensitivity is measured by the pressure change generated in the instrument with respect to the volume of fluid loss or recapture. Air is highly elastic compared to water, and its presence therefore significantly reduces instrument sensitivity. Air exclusion is desirable in defining and maintaining instrument sensitivity. Other characteristics affecting instrument sensitivity as it affects the opening point of the pilot valve include total volume of the chamber defined by tensiometer 74, the flexible surface area of the diaphragm 51 carried by assembly 50, and the hardness and length of the elastomeric valve seat 36.

Opening of the Valve Means

As the diaphragm assembly 50 approaches its maximum travel position during the opening phase, fluid pressure in chambers 14 and 16 approach equalization. At this point, and with the valve means 64 still in the closed position, a force is exerted on the chamber 16 side of the first diaphragm assembly 30. This force results from exertion of chamber 16 pressure over the seating area of the valve means 64 which is the surface area delimited by 0-ring seal 66. When this force combined with that of the compressed spring 48 exceeds the opposing force of pressure exerted on the chamber 14 side of diaphragm 31, the first movable diaphragm assembly 30 begins to move away from the valve closure member 52 under the urging of spring 48.

Figure 4:
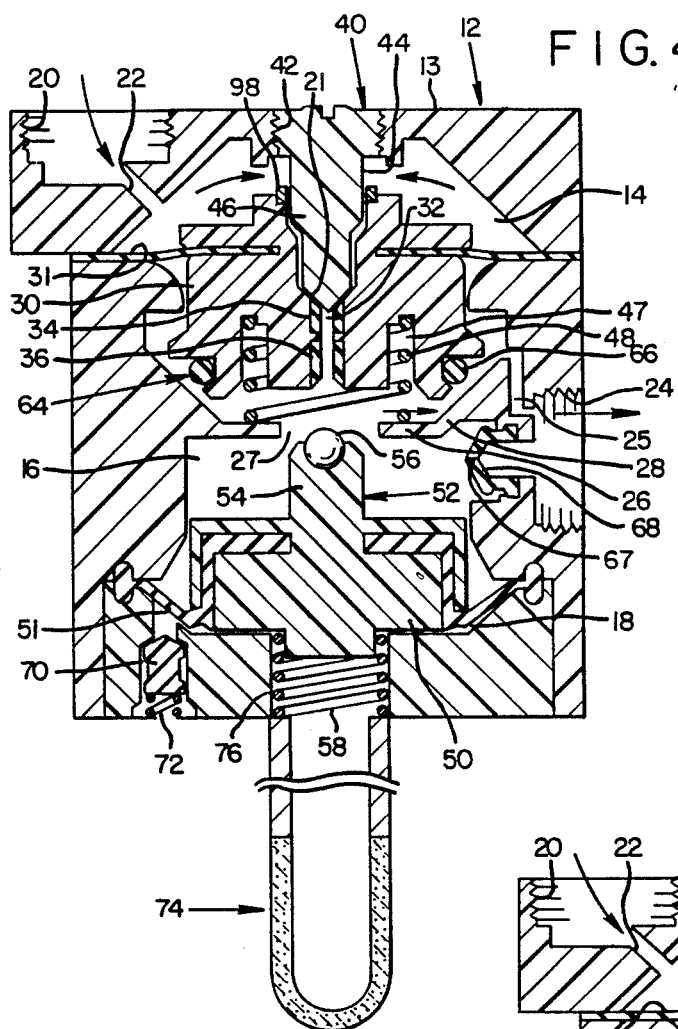

As shown in FIG. 4, travel of the diaphragm assembly 30 opens a controller outlet passageway 25 leading downstream from chamber 16, and which up to this point was sealed by the valve means 64. Opening of passageway 25 vents the hydraulic circuit upstream of control valve port 20. This venting creates a pressure differential across the diaphragm 90 in flow control valve 80 at the head of the hydraulic control circuit (see FIG. 1). The overall reduction of pressure in the hydraulic control circuit 10 as a result of these events results in the complete venting and opening of the main control valve 80 as depicted in FIG. 1B.

During the course of irrigation, and while the flow-restricting valve 96 is closed, a one gallon per hour flow rate passes through the hydraulic control circuit and eventually exits through passageway 25 leading from chamber 16 of the device. This flow is normally deposited away from the immediate vicinity of the ceramic sensing element of the tensiometer 74. The purpose of this low flow rate is to reduce to negligible proportions the pressure build-up in chamber 16 that would otherwise occur at higher flow rates. This negligible pressure in turn permits travel of diaphragm assembly 50 and closure of the closure member 52 at very low seating forces. At the same time, the continuous flow also provides the means for reestablishing pressure in the hydraulic control circuit 10.

The upward travel distance of the diaphragm assembly 30 is varied by adjusting the position of valve closing member 40. The position of closing member 40 is changed by rotating member 40 such that the interengaged helical threads around head 42 and the surrounding opening in body 13 advance member 40 further towards assembly 30 (FIG. 7). In addition to defining the distance of travel of the first diaphragm assembly 30, the illustrated member 40 is constructed to constitute a component of a backflow prevention valve 21 which seats against valve seat 34. The closing force for this valve is provided by spring 48, as well as downstream back-pressure acting on the chamber 16 side of diaphragm 31.

The backflow valve tends to remain closed during irrigation under the urging of spring 48. The spring force, however, is overcome by sufficient pressure build-up on the upstream side of diaphragm 31. Thus, during irrigation, the backflow valve continuously opens and closes in the form of a pressure-regulating valve as fluid emitted by trickle emitter 96 alternately builds up and is vented by the pressure regulating valve. The pressure in the hydraulic control circuit upstream of chamber 14 is determined by the extent of the compression of spring 48, and the effective surface area of diaphragm 31 with respect to chamber 14.

The resulting continuous fluctuating action of assembly 30 and diaphragm 31 during irrigation assists the mechanical filtering action of a metal "scrubbing" ring 98 which surrounds the middle shank portion 44 of adjustable valve closing member 40. The restricted passageway between ring 98 and valve closing member 40 prevents particulate matter from entering the small orifice of the passageway 32. A similar mechanism can be employed to filter fluid prior to its passage through the flow-restricting valve 96 at the head of the hydraulic control circuit 10. For example, the flow-restricting valve 96 could be located in the center of the control valve diaphragm.

Another event that occurs as a result of the opening of the valve means 64 is the suspension of the diaphragm assembly 50 at the approximate maximum position of travel that it attained during opening. This suspension results from the relief of pressure in chamber 16, the closing of pressure-relief valve 70, and the reestablishment of a vacuum in the tensiometer 74. The magnitude of this tensiometer vacuum is determined by the action of spring 58 upon diaphragm assembly 50, and it exceeds the vacuum required to open the second valve closing member 52 by an amount determined by the additional compression of spring 58 following pilot valve opening. The accentuated travel of the pilot valve closure member 52, the valve seat 36, and the valve means 64 provide a clear flow path during the operating (irrigation) mode.

Closing of the Closing Member

Figure 5:
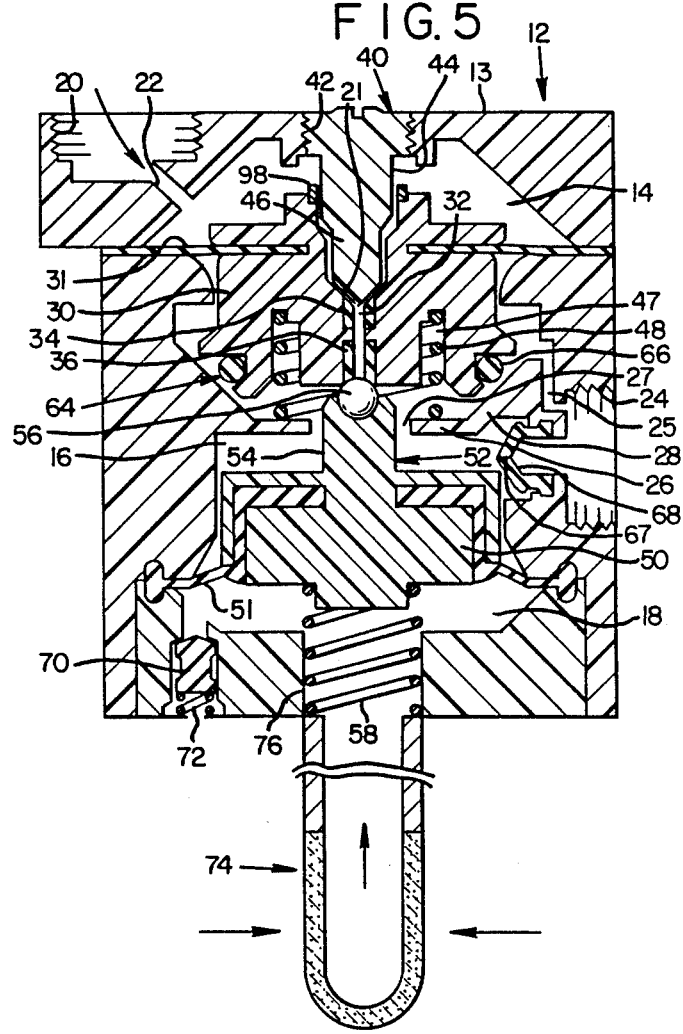

For the pilot valve to close, the controller 12 must recapture a volume of fluid equal to that expelled from the tensiometer 74 through valve 70 during the opening phase. In addition, it must also absorb sufficient water to permit additional travel of the diaphragm assembly 50 in order that the ball 56 of closure 52 may reach the new and displaced position of valve seat 36 as shown in FIG. 5.

The pressure differential available for the absorption of water across the ceramic membrane of tensiometer 74 is the partial vacuum generated by the action of spring 58 upon diaphragm 51 and its assembly 50. The source of water is normally the irrigation application system of which the controller 12 is a component. Alignment of the closing member 52 and valve seat 36 during the closing phase is encouraged by the self-centering design of the component parts of the instrument as a whole.

Closing of the Valve Means

When the ball 56 of closure member 52 contacts valve seat 36, the immediate effect is a slight increase in fluid pressure in chamber 14 in response to the trapping of fluid which is flowing through the hydraulic control circuit under regulation of the flow-restricting valve 96 at the head of the circuit (FIG. 1). This pressure increase acting upon diaphragm 31 begins to force assembly 30 and valve seat 36 against the ball 56 of closure member 52, thereby increasing the valve seating force. The increasing pressure also increases the sealing force by acting internally upon the elastomeric valve seat 36.

These combined actions are self-sustaining and promote the accelerated closing and sealing, which is desirable if a positive shut-off of the flow control valve 80 is to be achieved. This is particularly important in situations where the rate of travel of the valve closure 52 is slow during the closing phase, the fluid supply pressure is high, and the seating force against valve seat 36 is small.

Closure member 52 reverses the direction of travel upon contact with the valve seat 36 and moves from the position shown in FIG. 5 to the position shown in FIG. 6. This reversal of direction further promotes the accelerated closing of the valve by converting the pressure status of the tensiometer chamber 74 to a positive condition from that of a vacuum. This results from the transmission of force to the diaphragm assembly 50. Pressurization of tensiometer 74 continues with the increasing pressurization of chamber 14 and does not cease until the valve means 64 seats against the wall 28 of body 13, as shown in FIG. 6. The displacement of diaphragm assembly 50 into the tensiometer chamber 74 is accommodated by a second venting of fluid through the pressure-relief valve 70, as well as by the expulsion of fluid outwardly through the porous ceramic membrane of the tensiometer. This latter event also serves to back-flush the ceramic membrane and prolong its porous life.

Once both diaphragm assemblies 30, 50 assume the fully closed positions shown in FIG. 6, fluid pressure upstream of assembly 30 begins to increase as flow-restricting valve 96 emits a low flow of water. As fluid pressure builds in line 89, pressure at venting outlet 86 increases. When the pressure in top chamber 92 is equal to or greater than pressure in bottom chamber 94, diaphragm 90 moves from the open position shown in FIG. 1B to the closed position shown in FIG. 1A. Flow of irrigation fluid from inlet 82 to primary outlet 84 is thereby blocked, and irrigation ceases.

Manual Override

Irrigation may be interrupted, or automatic activation overridden, by means of threaded adjustable valve-closing member 40 as shown in FIG. 7. To interrupt irrigation when the controller is in the operating position shown in FIG. 4, the externally threaded member 40 is rotated against meshing threads 42 in the top of body 13 to advance the pointed tip of closure member 40 towards passageway 32, which in turn forces assembly 30 downwardly until 0-ring 66 seats against slanted surface 28, as shown in FIG. 7. Diaphragm assembly 30 is unable to reciprocate to vent fluid pressure from upstream of closure member 40, which builds pressure in line 89 until flow control valve 80 closes to terminate irrigation. Automatic activation of irrigation is prevented as long as closure member 40 is in the position shown in FIG. 7 because even if reduced pressure in tensiometer 74 pulls the ball 56 of closure member 52 away from seat 36, assembly 30 cannot move up to open valve means 64, and pressure cannot be vented past assembly 30.

Activation by Back-Pressure

Figure 8:
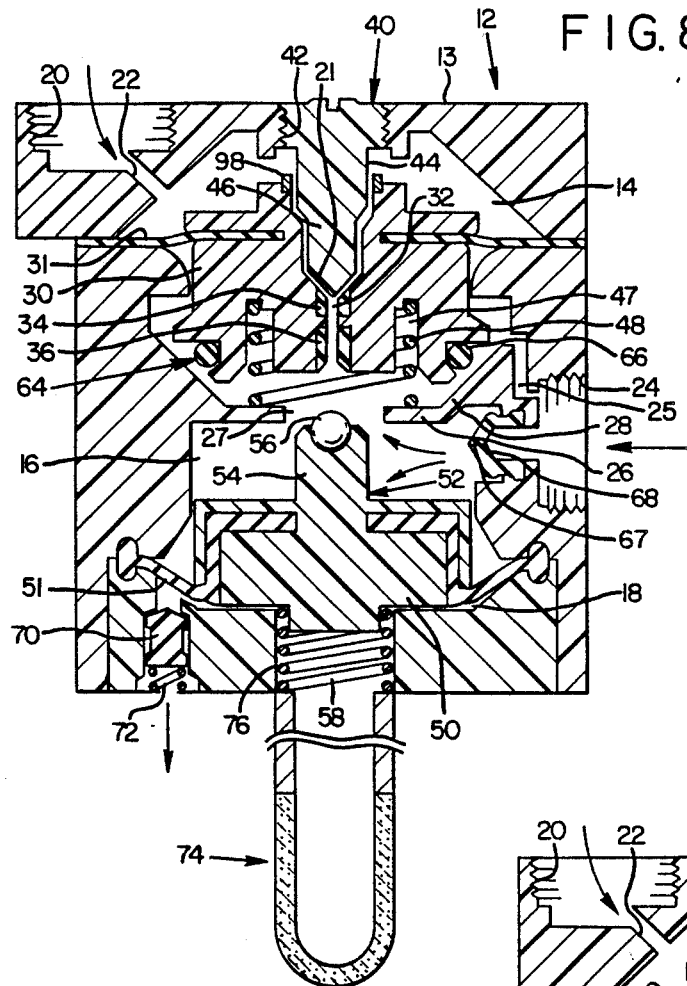
FIG. 8 is a view of the controller similar to FIG. 7 but which illustrates how irrigation can be initiated by applying back pressure to the controller.

As shown in FIG. 8, momentary application of sufficient back-pressure to chamber 16 by any means will open the controller valve 12 and initiate irrigation. To open, the induced pressure differential across either diaphragm 51 or diaphragm 31 by the applied back-pressure should exceed that required to maintain the ball 56 of closure 52 seated against valve seat 36.

One such means of activation is the application of pressure to the controller via outlet port 24, as shown in FIG. 8. Pressure in such a case would be initially transmitted to chamber 16 through orifice 67 of one-way check valve 68. Release of the source of back-pressure to outlet port 24 then allows the normal opening sequences depicted in FIGS. 3 and 4.

Such a feature provides a convenient alternative means for activating the irrigation system. It also provides a means for venting accumulated gases from the top of the tensiometer 74, if so desired.

A modification of this latter feature would be the use of closure member 40 to prevent actual activation of the control valve while achieving manual venting of gases from the top of the tensiometer 74 through back-pressure application. This could be practiced when the soil surrounding tensiometer 74 is saturated so that the tensiometer replenishes itself with fluid from the soil moisture reservoir.

Sustained application of back-pressure through outlet port 24 will partially activate the instrument when the magnitude of the back-pressure, combined with that induced by the force of spring 48 acting upon diaphragm 31, exceeds the fluid pressure in chamber 14. This results in the opening of valve closure member 52 by displacement of diaphragm assembly 50 into tensiometer 74, venting of fluid through pressure relief valve 70, downward travel of the diaphragm assembly 30, and closure of the backflow valve means 21. Opening of the upstream irrigation control valve is prevented as long as back pressure is applied because closure member 40 remains seated against valve seat 34, and chamber 14 remains pressurized. Only upon release of the downstream back-pressure may irrigation commence.

Initiation of irrigation by applying backflow pressure is useful or sequencing irrigation between different zones subject to valve control, because an instrument in a second zone can be partially activated by the presence of water pressure in the application system of a preceding zone. Termination of irrigation and water pressure in the preceding application zone then provides the necessary pressure loss signal to permit further operation of the instrument in the secondary zone, and so forth. A typical operating and closing sequence following such pressure release is depicted in FIGS. 4, 5 and 6.

Activation by Pressure Release

A momentary release of pressure upstream of chamber 14 will produce a pressure loss throughout the hydraulic control circuit upstream of the controller 12. This pressure loss, which can be induced manually or automatically by an electrically operated pilot valve, results in the closure of the flow-restricting valve 96 at the head of circuit 10 (FIG. 1), and the venting and operation of the irrigation flow control valve 80 to initiate irrigation.

An advantage of this feature is that it permits operation of the instrument when it is not calling for irrigation. Such a feature can be useful for a wide range of reasons, including the need to irrigate after fertilizer application, plant temperature control, and frost protection.

If the pressure loss results from a shut-down or loss of pressure in the irrigation supply, then seating of seat 34 against the tip of closure member 40 also prevents back-siphonage and loss of prime in the hydraulic control circuit. The negative pressure which may occur in the hydraulic control circuit under such circumstances further increases the seating force between seat 34 and closure member 40 by reverse action upon diaphragm 31.

Figure 9:
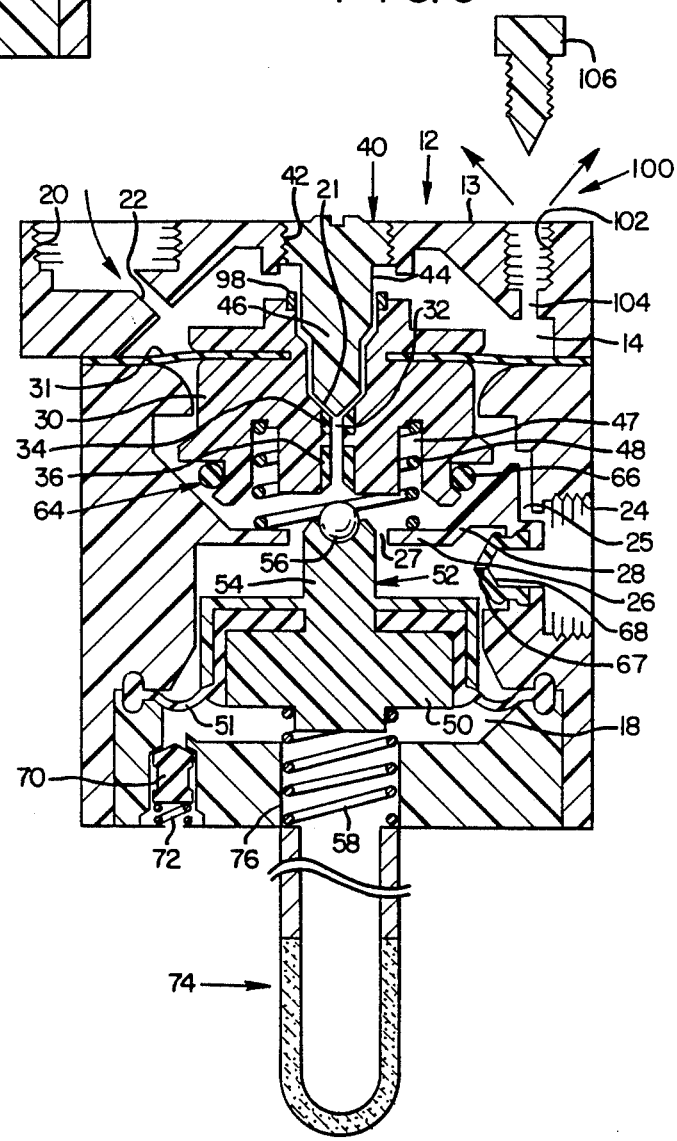
FIG. 9 is a somewhat schematic, vertical sectional view of another embodiment of the controller which illustrates how irrigation can be initiated by releasing pressure from the controller by removing a manual actuator.
Figure 10:
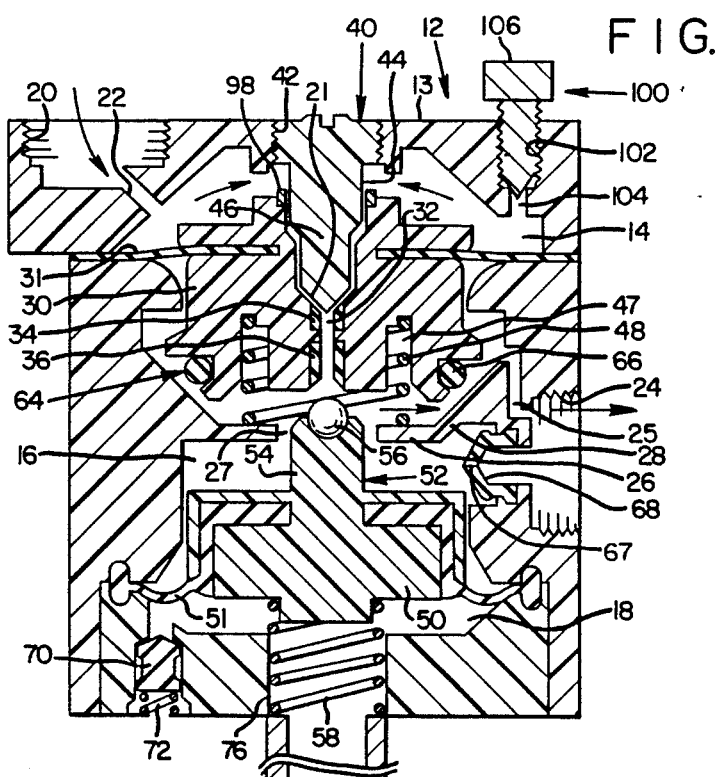
FIG. 10 is a view similar to FIG. 9 wherein the manual actuator has been replaced.

FIGS. 9 and 10 illustrate one embodiment of a controller 12 which incorporates a pressure venting means 100. The vent 100 includes an internally threaded bore 102 through the top of body 13. Threaded bore 102 fluidly connects chamber 14 with atmosphere through a fluid passageway 104. An externally threaded plug 106 is selectively screwed into bore 102 to fluidly seal passageway 104. Plug 106 is selectively screwed out of bore 102 to release pressure from chamber 14 to initiate irrigation.

If the venting means for pressure release shown in FIG. 9 is subsequently closed as shown in FIG. 10, the pathway for the restricted flow passing the flow-restricting valve 96 at the head of the hydraulic circuit (FIG. 1) becomes the normal controller outlet pathway described in connection with FIG. 4, with the exception that the closure member 52 is not displaced away from its normally closed location. It is, however, suspended by a vacuum. Closure member 52 can be closed by water ingress into the tensiometer 74 via its ceramic membrane, or by adjusting closure member 40 to move assembly 30 downwardly and reestablish contact between the valve seat 36 and the ball 56 of closure member 52. The adjustable closure member 40 may then be withdrawn to its normal position without the closure member 52 reopening.

There are many advantages to using a pressure release valve in fluid circuit 10. Irrigation can, for example, be initiated on a time-basis using a solenoid-operated pilot valve to vent the hydraulic control circuit 10, and then by closing the pilot valve, donate the decision to terminate irrigation to the hydraulic control device. The duration of irrigation, or whether irrigation is required at all, will then be based on prevailing soil moisture conditions rather than the passage of time. Another advantage is that two hydraulic irrigation controllers as described and connected in parallel to the same hydraulic control circuit, will activate in sympathy. In such a manner, irrigation may be initiated by an instrument located at a shallow soil depth, and be terminated when the applied water reaches a second instrument located at a deeper soil depth. Such application meets the needs of many irrigation situations such as trickle irrigation. Other combinations are possible.

Set-Point Adjustment

The seating force for closure of member 52 against seat 36 is provided by spring 58 acting upon the closure member 52 via diaphragm assembly 50; the rate of spring 58 (force per unit of compressed length) and the effective area of the pressure-responsive surface of diaphragm 51 being known.

Figure 11:
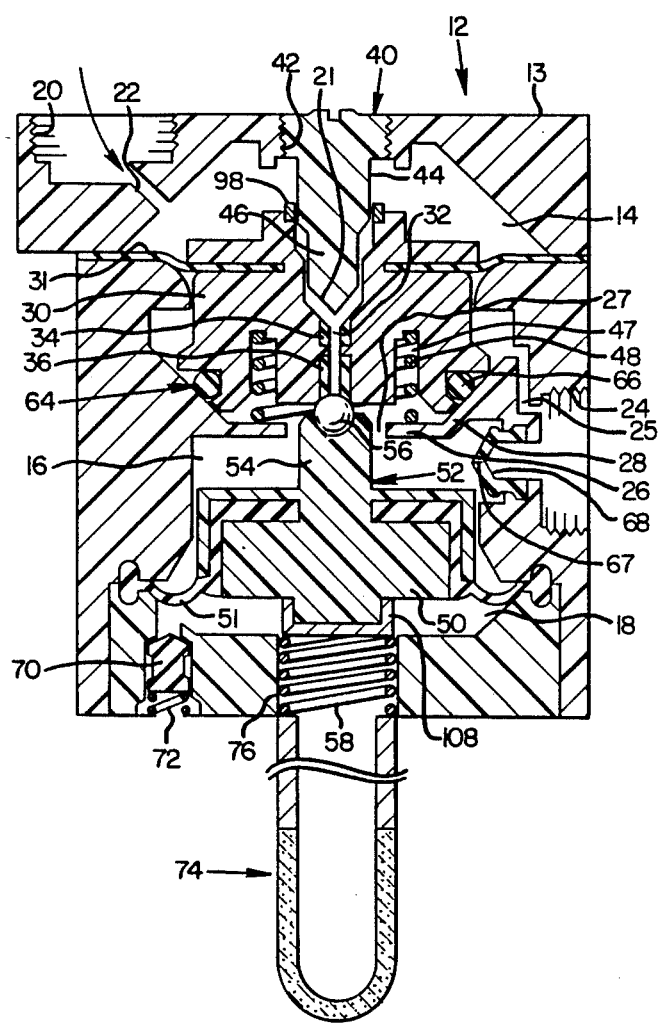
FIG. 11 is a vertical sectional view of yet another embodiment of the controller which incorporates a set point adjustment member on the second diaphragm assembly.

Movement of assembly 50 is initiated when the combined effects upon assembly 50 of negative pressure in tensiometer 74, downstream pressure in chamber 16, and the small effect of fluid pressure in chamber 14 incident upon seating area of ball 56, exceed the seating force of compression spring 58. The opening or "set-point" of present embodiments of the invention is adjustable by two means, these being:

A. Altering the compressed force of spring 58 by adjustable means such as an insert cap 108 (FIG. 11) of known thickness, or by replacement of the spring itself with another of different rate. In the disclosed embodiment, insert 108 is a cap which fits over a cooperatively shaped portion of the bottom face of assembly 50.

Figure 12:
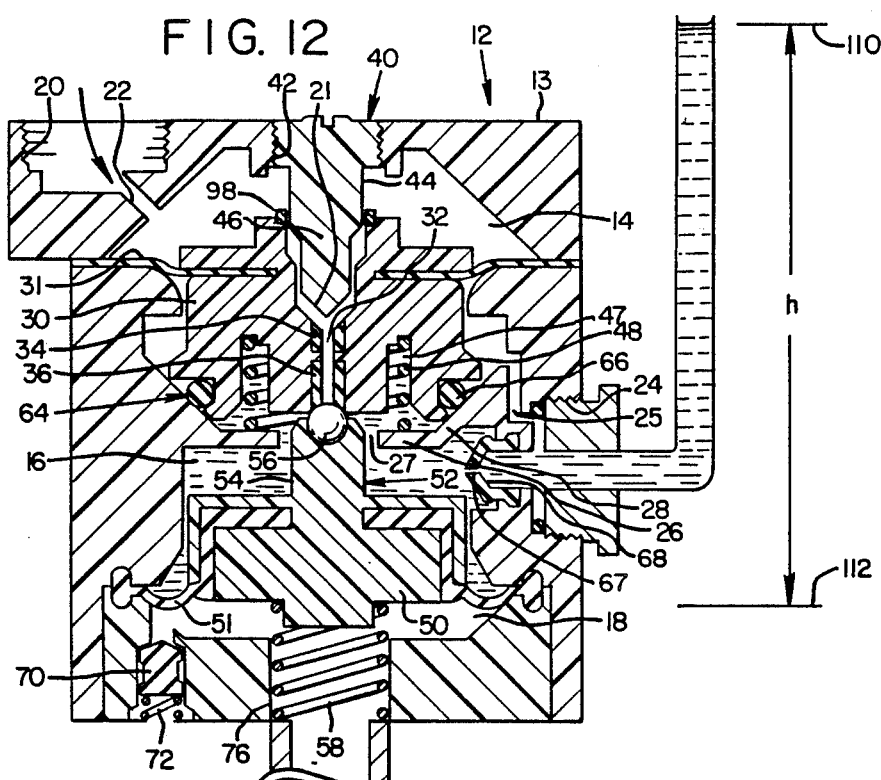
FIG. 12 is a vertical sectional view of another embodiment of the controller which incorporates an outlet height set point adjustment.

B. Altering the pressure in chamber 16 by adjusting the outlet height 110 (FIG. 12) of the hydraulic control circuit with respect to the reference position 112 of diaphragm 51. This adjustment may be in an upward (positive) or downward (negative) direction. A positive increase in the outlet height of 10 cm increases the pressure in chamber 16 by approximately 1 centibar, and correspondingly decreases the vacuum required to initiate opening of controller 12 by the same degree (100 centibars equal one atmosphere). Adjustment of the outlet height 110 in the negative direction with respect to reference point 112 achieves the opposite effect.

Figure 13:
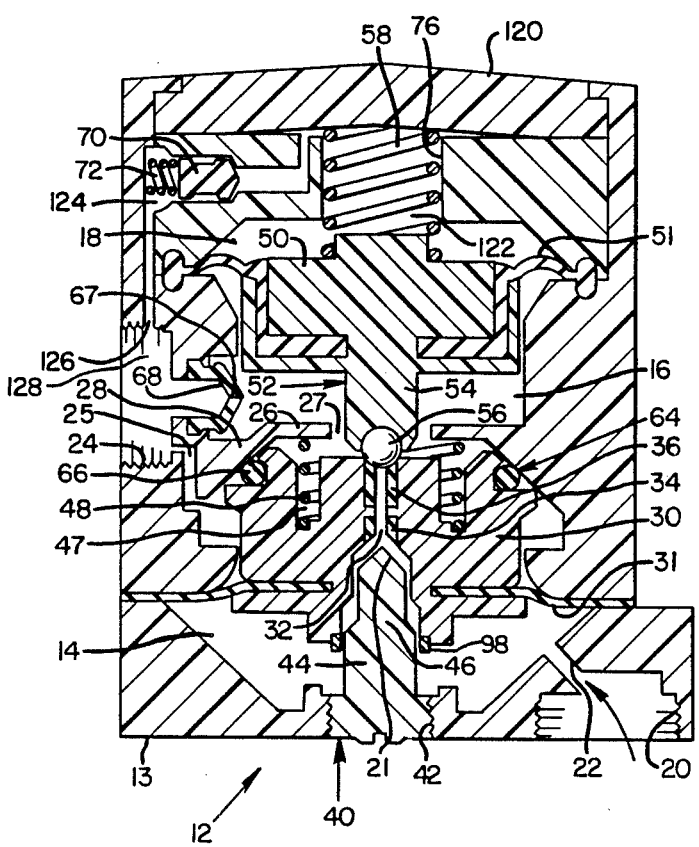
FIG. 13 is a vertical sectional view of a fully automatic embodiment of the controller in which a porous membrane is placed on top of the controller.
Figure 14:
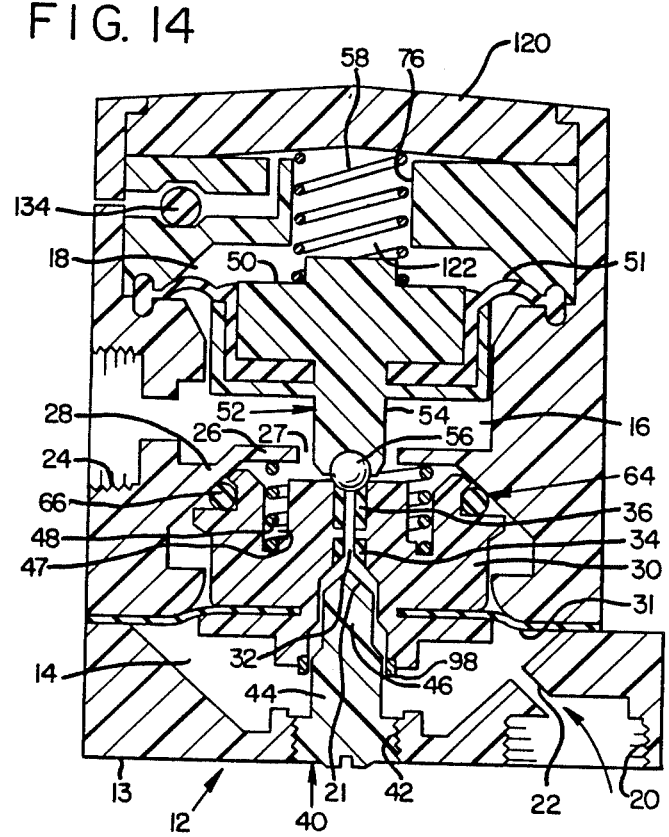
FIG. 14 is a vertical sectional view of a semiautomatic embodiment of the controller in which a porous membrane is placed on top of the controller.

Fine adjustment of the opening point further enhances the well-defined hydraulics of devices employing the technology, and also permits adjustment of permanently buried instruments (see FIGS. 13 and 14). Fluid prime in an extension of the hydraulic circuit downstream of the device is automatically maintained by several means which include continuous replenishment during the operating mode, the normally closed position of the closure member 52, and closure of valve seat 34 against the backflow member 40 in the event of loss of pressure in chamber 14.

Cell-Type Controller

A further embodiment of the technology is represented by a cell-type instrument in which a ceramic membrane 120 and tensiometer chamber 122 are upwardly oriented. Advantages of such an embodiment include the control of irrigation of very shallow media, and the suitability of the device for permanent burial.

In a fully automatic embodiment as shown in FIG. 13, functional capabilities of the instrument are similar to those of the probe-style embodiment, with the exception that fluid and gases from the top of the tensiometer chamber 122 are expelled through a relief valve 124 which vents to a downstream passageway 126 rather than directly to the atmosphere. A second significant difference is that the instrument can be permitted to remain buried for prolonged periods in conditions of dryness that exceed the normal range of operation of hydraulic tensiometers. Under such conditions, the ceramic membrane 120 will lose its prime and the instrument will cease to be capable of generating an activating vacuum. The tensiometer chamber 122, however, will maintain its fluid content due to its inverted design. Thus, when desired, function of the instrument can be restored by applying back-pressure to chamber 16 via the downstream end 128 of the hydraulic circuit. This back-pressure displaces diaphragm assembly 50 into the tensiometer chamber 122 and primes the ceramic membrane 120 with the fluid contents of chamber 122, expelling air upwardly from the ceramic plate in the process. Function is thus reestablished at this point and a vacuum generated upon release of the back-pressure. Irrigation will then continue until sufficient water is recaptured by the instrument to close the pilot valve, replenishing the fluid contents of chamber 122 in the process.

FIG. 14 shows a semiautomatic cell-type controller similar to that described in FIG. 13. A modification, however, is the elimination of automatic activating capabilities. This is achieved by venting the tensiometer chamber 122 to the atmosphere using a normally open, two-way check valve 134 instead of a normally closed pressure relief valve. This prevents development of the vacuum necessary for such an instrument to automatically open the valve closure member 52 upon drying. Loss of this function by this or other means eliminates the need for a one-way pressure check valve 68 (see FIG. 13), the principal purpose of which is to accelerate and accentuate travel of the valve closure member 52 during automatic opening. The object of this embodiment, however, is to terminate irrigation following receipt of an activating downstream back-pressure signal; the subsequent priming of the ceramic plate with fluid from chamber 122; and release of the back-pressure. Valve 134 will close subsequent to the foregoing and permit a vacuum to be established in chamber 122. This vacuum is maintained until sufficient water is recaptured to close the valve. Pressurization of chamber 122 upon closing of the pilot valve serves to return valve 134 to an open condition. Instruments of this design are useful as "slave-type" irrigation sequencing devices.

Pressure-Responsive Controller

Figure 15:
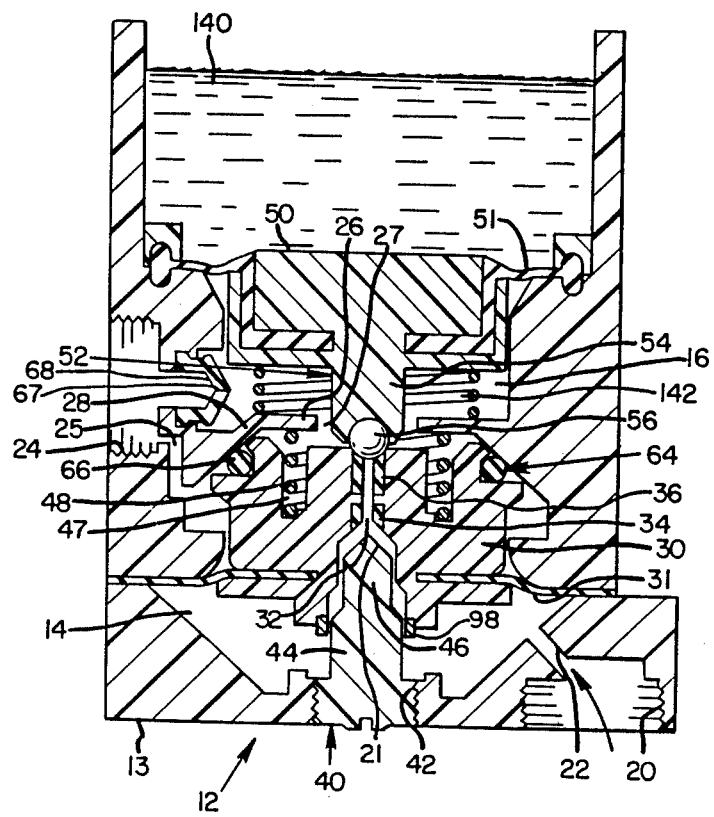
FIG. 15 is a vertical sectional view of another embodiment of the pressure responsive controller having a water filled chamber on top.

Embodiments of the technology are suited to the maintenance of defined differentials in the level of fluid in containment vessels. Such an embodiment is represented in FIG. 15. The seating force for diaphragm assembly 50 is provided by the height of fluid (h) in an open vessel 140. When this level falls either through evaporation or drainage below the set-point of the device, the pilot and control valve are opened.

The opening set-point is determined by the differential force between that exerted by the fluid head (h) on diaphragm assembly 50, and an opposing spring 142. Replenishment of the vessel is controlled by the flow control valve. The height of fluid required to close the pilot valve is determined by the distance that the valve seat 36 is permitted to travel subsequent to opening, and the force per unit length, in this embodiment, of compression of spring 142.

Having illustrated and described the principles of my invention with reference to several preferred embodiments, it should be apparent to those persons skilled in the art that such invention may be modified in arrangement and detail without departing from such principles. For example, if backflow prevention and pressure regulation are not important, it would not be necessary for the member 40 to act as a valve closing member. Some other form of stop could be used to limit travel of the first diaphragm assembly 31 in the direction urged by spring 48. Also, the check valve 68 could be omitted if it is not necessary for the controller 12 to rapidly open the flow control valve 80. I thus claim as my invention all such modifications as come within the true spirit and scope of the following claims.

I claim:

1. A moisture and pressure sensitive fluid flow control system comprising:
    controller body means defining first, second and third chambers, a control valve port communicating with the first chamber, a controller outlet, and a controller outlet passageway connecting the outlet with the second chamber;
    a first movable diaphragm assembly separating and defining a diaphragm passageway between the first and second chambers, the passageway having an end which opens into the second chamber, and the assembly being constructed to provide a valve seat at the end;
    first diaphragm biasing means for urging the first movable diaphragm means toward the first chamber;
    a second movable diaphragm assembly separating the second and third chambers and including a valve closing member; and
    in communicating with the third chamber, fluid detection means adapted to apply a closing force so as to move the second movable diaphragm assembly such that the valve closing member seats in the valve seat when sufficient fluid is present in a region to be sensed for fluid;
    the system being constructed such that, in the absence of sufficient fluid in the region to be sensed, fluid is allowed to flow from the control valve port to the controller outlet via the controller outlet passageway.

2. The system of claim 1 further comprising valve means in the outlet passageway, the valve means being openable by movement of the first diaphragm assembly in the direction urged by the first diaphragm biasing means.

3. The system of claim 1 wherein the fluid detection means comprises a porous element adapted to be placed in moisture transfer relationship with a medium in a region where moisture status is to be sensed.

4. The system of claim 3 wherein the porous element fluidly communicates with said third chamber.

5. The system of claim 3 wherein the porous element is an elongated tensiometer probe projecting outwardly from said controller body means.

6. The system of claim 3 wherein the porous element is a plate which fits against said controller body means.

7. The system of claim 3 further comprising diaphragm biasing means for urging the second movable diaphragm assembly toward a position where the valve closing member seats in the valve seat.

8. The system of claim 1 wherein the fluid detection means comprises an open vessel located above the second movable diaphragm assembly so that the closing force is applied by the action of gravity on liquid in the vessel.

9. The system of claim 8 further comprising second diaphragm biasing means for urging the second movable diaphragm assembly toward a position where the valve closing member is removed from the valve seat.

10. The system of claim 1 wherein:
    the body defines a second outlet passageway between the outlet and the second chamber; and
    a one way valve is provided in the second outlet passageway to allow fluid flow from the outlet to the atmosphere.

11. The system of claim 1 further comprising a flow control valve having a body which defines an inlet for connection to a source of pressurized fluid, a primary outlet and a venting outlet, and means for opening or closing the primary outlet automatically through the release or application of fluid pressure, respectively, to the venting outlet, said venting outlet being in fluid-tight communication with the control valve port of the controller.

12. The system of claim 11 further comprising:
    means defining a fluid transfer passageway for connecting the source of pressurized fluid to the control valve venting outlet and the control valve port of the controller; and
    flow-restricting means, provided in the passageway, to restrict flowing of pressurized fluid through the passageway to the venting outlet 86 of the control valve and the control valve port 20 of the controller.

13. The system of claim 12 wherein the flow-restricting means comprises a valve suitable to allow fluid to flow at a constant slow rate over a wide range of upstream pressures.

14. The system of claim 12 wherein the flow-restricting means comprises at least a region of the passageway with a cross-sectional area sufficiently small to limit the rate at which fluid can flow through the passageway.

15. The system of claim 1 further comprising pressure release means for selectively venting pressure from the first chamber.

16. The system of claim 15 wherein the pressure release means comprises:
a pressure release outlet from the first chamber to atmosphere; and
a removable plug for selectively sealing said pressure release outlet.

17. The system of claim 1 further comprising set point adjustment means.

18. The system of claim 17 wherein the set point adjustment means comprises a chamber communicating with the controller outlet for selectively varying an outlet height of the controller.

19. The system of claim 1 further comprising stop means to limit travel of the first movable diaphragm assembly in the direction urged by the first diaphragm biasing means.

20. The system of claim 1 wherein:
the diaphragm passageway has an end which opens into the first chamber;
the first movable diaphragm assembly is constructed to provide a valve seat at the end which opens into the first chamber; and
a valve closing member is provided in the first chamber to mate with the valve seat at the end which opens into the first chamber.

21. The system of claim 20 further comprising means for adjusting the position of the valve closing member in the first chamber with respect to the position of at least a part of the first diaphragm biasing means.

22. The system of claim 1 further comprising pressure application means for selectively applying pressure to the second chamber.

23. A moisture-sensitive liquid flow control system comprising:
controller body means defining first, second and third chambers, a control valve port communicating with the first chamber, a controller outlet, and a controller outlet passageway connecting the outlet with the second chamber;
a first movable diaphragm assembly separating and defining a diaphragm passageway between the first and second chambers, the ends of the diaphragm passageway being first chamber and second chamber valve seats respectively;
a first valve closing member within the first chamber;
first diaphragm biasing means for urging the first movable diaphragm means such that the first valve closing member seats in the first valve chamber seat;
a second movable diaphragm assembly separating the second and third chambers and including a second valve closing member;
valve means in the outlet passageway, the valve means being openable by movement of the first diaphragm assembly in the direction urged by the first diaphragm biasing means; and
in communication with the third chamber, moisture detection means adapted to apply a closing force to move the second movable diaphragm assembly such that the second valve closing member seats in the second valve chamber seat when moisture is present in a region to be sensed for moisture.

24. The system of claim 23 wherein the moisture detection means comprises a porous element adapted to be placed in moisture transfer relationship with soil in a region where moisture is to be sensed.

25. The device of claim 23 further comprising second diaphragm biasing means for urging the second movable diaphragm assembly toward a position where the second valve closing member seats in the second valve chamber seat.

26. The system of claim 23 wherein the moisture detection means comprises an open vessel located above the second movable diaphragm assembly so that the closing force is applied by the action of gravity on liquid in the vessel.

27. The system of claim 26 further comprising second diaphragm biasing means for urging the second movable diaphragm assembly toward a position where the second valve closing member is removed from the second valve chamber seat.

28. The system of claim 23 wherein:
the body defines a second outlet passageway between the outlet and the second chamber; and
a one way valve is provided in the second outlet passageway to allow liquid flow from the outlet into the second chamber.

29. The system of claim 23 further comprising a flow-restricting valve means or passageway separating a source of fluid pressure from both the venting outlet of the control valve, and the control valve port of the controller.

* * * * *